UNITED STATES PATENT OFFICE.

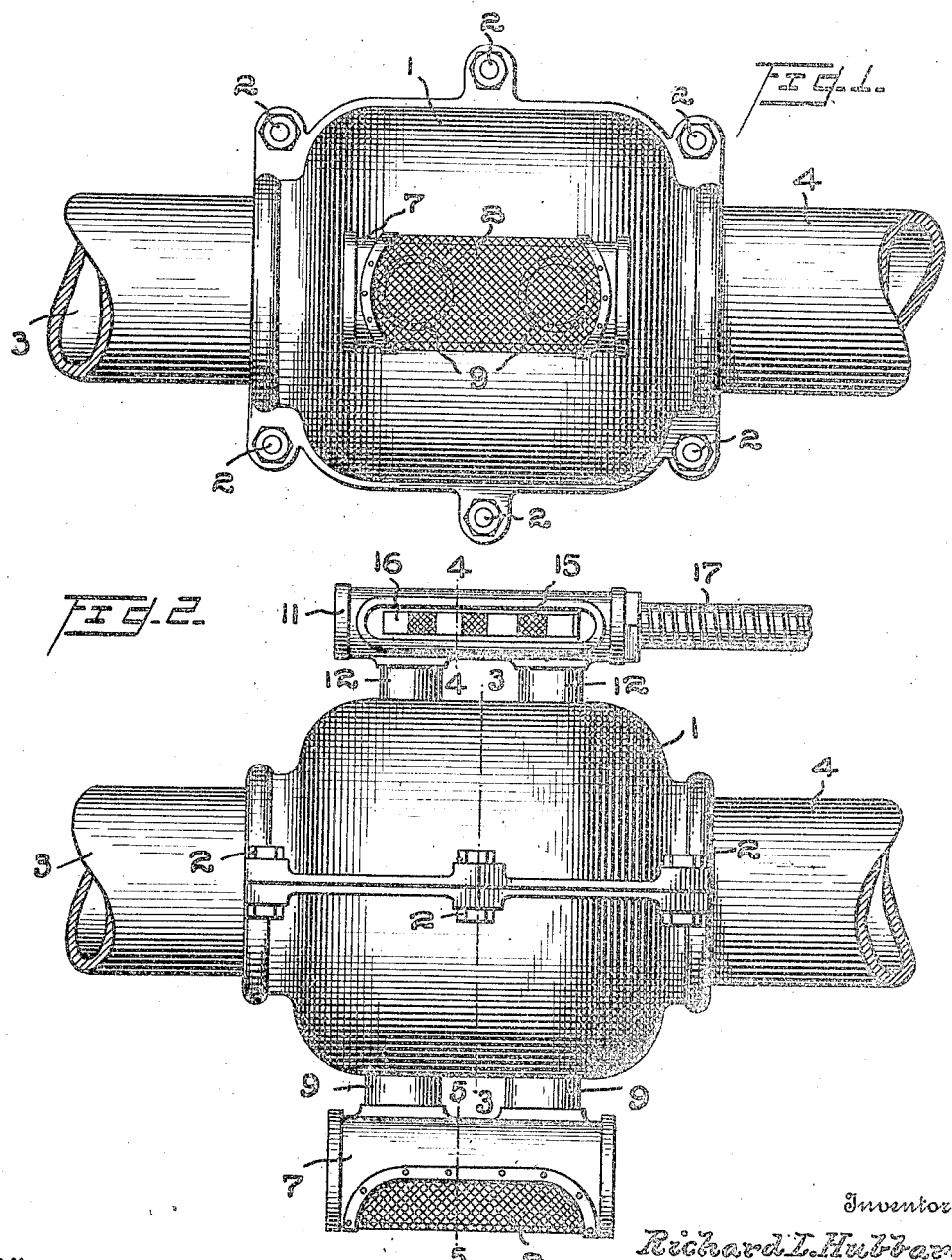

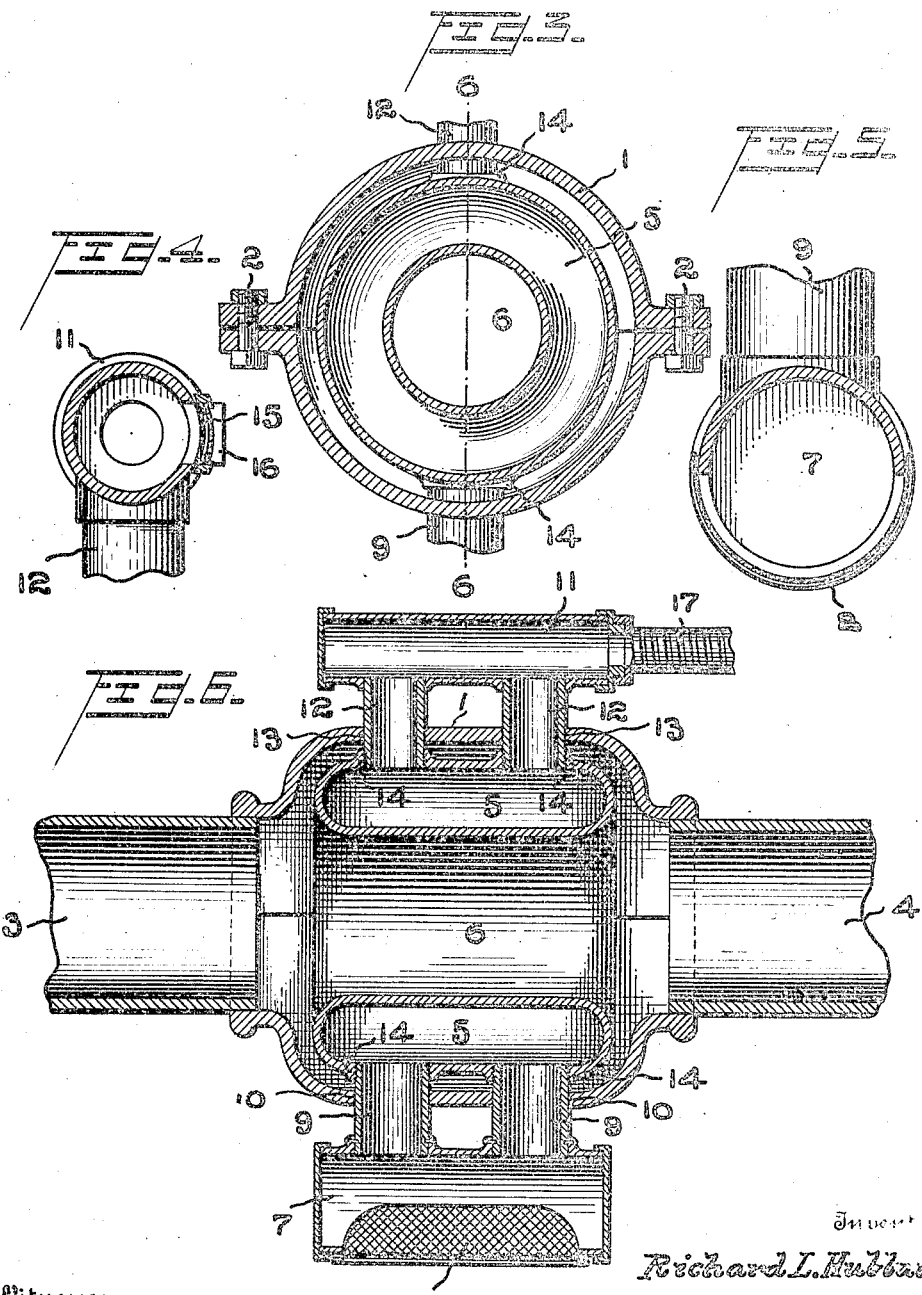

RICHARD L. HUBBARD, OF ASTORIA, NEW YORK.

AIR-HEATER.

1,126,011.  Specification of Letters Patent.  Patented Jan. 26, 1915.

Application filed February 11, 1914. Serial No. 818,117.

*To all whom it may concern:*

Be it known that I, RICHARD L. HUBBARD, a citizen of the United States, residing at Astoria, in the county of Queens and State of New York, have invented certain new and useful Improvements in Air-Heaters, of which the following is a specification.

My invention relates to improvements in air heaters, and more particularly to an improved device adapted to be connected to the exhaust manifold of an engine, and insure the heating of a sufficient quantity of air to the desired temperature to supply a carbureter with the same and insure a highly explosive mixture.

A further object is to provide a device of this character which may be used in the exhaust passage forming a part of the exhaust pipe and utilize to a maximum degree the heat of the exhaust without diminishing the diameter of the passage so as not to form any obstruction to the free exhaust.

A further object is to provide a device of the character stated which embodies in its construction an annular chamber confined within, but spaced from, a cylindrical casing, so that the exhaust gases pass around as well as through the annular chamber to thoroughly heat the air passing therethrough.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a top plan view. Fig. 3 is a view in cross section on the line 3—3 of Fig. 2. Fig. 4 is a view in cross section on the line 4—4 of Fig. 2. Fig. 5 is a view in section on the line 5—5 of Fig. 2, and Fig. 6 is a view in longitudinal section on the line 6—6 of Fig. 3 showing the complete device with its inlet and outlet chambers in position.

1 represents the casing of my improved air heater which is preferably in two half sections secured together by bolts 2, and clamping alined pipes 3 and 4 respectively, the former constituting the exhaust tube from a motor manifold, and the latter constituting the exhaust tube to the muffler. The casing 1 is of general cylindrical form of appreciably greater diameter than the tubes 3 and 4, except at its ends where said casing is reduced in diameter to securely clamp the tubes.

Within the casing 1, an annular air chamber 5 is located. This chamber I refer to as annular because it constitutes a hollow ring cylindrical in form, and having a passage 6 therethrough in line with the tubes 3 and 4, and of substantially the same diameter so that the chamber 5 in no wise diminishes the diameter of the passage which might tend to choke the exhaust. Furthermore, it will be noted that the annular chamber is of an external diameter appreciably less than the internal diameter of casing 1, so that a space is provided all around the chamber, and the highly heated gases or products of combustion not only flow through the passage 6, but also around the outer wall of the casing, so that the said annular air heating chamber receives direct contact of heat throughout its entire surface.

7 represents a cylindrical air inlet chamber having an elongated screened opening 8 through which the air is admitted. This chamber 7 is connected by parallel pipes 9 with chamber 5 and extends through openings 10 in casing 1.

11 is an outlet chamber which is connected by pipes 12 with chamber 5 on the side of casing 1 opposite to chamber 7, and these pipes 12 extend through openings 13 in casing 1. The pipes 9 and 12 are preferably screwed into bosses 14 on the chamber 5, and these bosses insure the spacing of the chamber from the casing. They may be of any desired length, but are long enough to prevent any choking of the passage around the outside of the chamber 5 by reason of the outer wall of the chamber being located against the inner surface of the casing. The outlet chamber 11 is provided with screened openings 15 controlled by a slide or damper 16, and a pipe 17 connects one end of this outlet chamber 11 with the carbureter or other point of use not shown.

By reason of the openings 15 and damper 16, any desired amount of cold air may be supplied to reduce the temperature of the air and allow a complete regulation of the temperature to suit conditions.

In operation, the air is thoroughly screened as it enters chamber 7, then passes through pipes 9, thence through the chamber 5, thence through pipes 12 and outlet chamber 11 in a highly heated condition. The air in chamber 5 is subject to radiation of heat from all walls of said air chamber as the hot gases pass through the passage 6, and also pass around the chamber without choking the passage in the slightest.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A device of the character described, comprising a casing consisting of two half sections bolted together and adapted to clamp the ends of alined pipes, an annular air heating chamber extending longitudinally of the casing intermediate of the ends of the latter, said heating chamber independent of the casing and spaced from the walls thereof, inlet and outlet pipes extending through the wall of the casing communicating with the interior of the heating chamber and holding the latter spaced from the wall of the casing, substantially as described.

2. A device of the character described, comprising a casing consisting of two half sections bolted together and adapted to clamp the ends of alined pipes, an annular air heating chamber extending longitudinally of the casing intermediate of the ends of the latter, said heating chamber independent of the casing and spaced from the walls thereof, inlet and outlet pipes extending through the wall of the casing communicating with the interior of the heating chamber and holding the latter spaced from the wall of the casing, a screened inlet chamber connected to the inlet pipes, and an outlet chamber connected to the outlet pipes, substantially as described.

3. A device of the character described, comprising a casing consisting of two half sections bolted together and adapted to clamp the ends of alined pipes, an annular air heating chamber extending longitudinally of the casing intermediate of the ends of the latter, said heating chamber independent of the casing and spaced from the walls thereof, inlet and outlet pipes extending through the wall of the casing communicating with the interior of the heating chamber and holding the latter spaced from the wall of the casing, said casing at its ends reduced in diameter and adapted to be connected to pipes of the same internal diameter as the air heating chamber, substantially as described.

4. A device of the character described, comprising a casing consisting of two half sections bolted together and adapted to clamp the ends of alined pipes, an annular air heating chamber extending longitudinally of the casing intermediate of the ends of the latter, said heating chamber independent of the casing and spaced from the walls thereof, inlet and outlet pipes extending through the wall of the casing communicating with the interior of the heating chamber and holding the latter spaced from the wall of the casing, a screened inlet chamber connected to the inlet pipes, an outlet chamber connected to the outlet pipes, said casing at its ends reduced in diameter and adapted to be connected to pipes of the same internal diameter as the air heating chamber, substantially as described.

5. The combination with sections of an exhaust tube located in alinement, a sectional casing having reduced ends secured upon the ends of the alined tubes, and said casing between its ends of an appreciably greater diameter than the tubes, an annular air chamber located inside the casing and having a passage therethrough in line with the tubes and spaced from the wall of the casing, whereby a passage is provided around the chamber, a screened air inlet chamber outside of the casing, an outlet chamber outside of the casing, pipes connecting said last-mentioned chambers with the air heating chamber, and means for controlling the admission of cold air to the said outlet chamber, substantially as described.

6. A device of the character described, comprising a casing, an annular air heating chamber in the casing independent of the casing and spaced from the walls thereof, an inlet chamber outside the casing, an outlet chamber outside the casing, pipes extending through the wall of the casing and connecting the inlet chamber and the outlet chamber with said air heating chamber, and means for admitting cold air to the outlet chamber, substantially as described.

7. A device of the character described, comprising a casing, an annular air heating chamber in the casing independent of the casing and spaced from the walls thereof, an inlet chamber outside the casing, an outlet chamber outside the casing, pipes extending through the wall of the casing and connecting the inlet chamber and the outlet chamber with said air heating chamber, a screened cold air inlet in said outlet chamber, and means for controlling the flow of air through said last-mentioned inlet, substantially as described.

In testimony whereof I have signed my name to this specification in the presence of two subscribing witnesses.

RICHARD L. HUBBARD.

Witnesses:
MARY F. MAHER,
EDWARD J. MAHER.